Nov. 23, 1965 S. G. TUCKER 3,219,982

HIGH ORDER MARK SYSTEM

Filed Nov. 14, 1961 3 Sheets-Sheet 1

INVENTOR

STUART G. TUCKER

BY Delbert C. Thomas

ATTORNEY

Nov. 23, 1965 S. G. TUCKER 3,219,982

HIGH ORDER MARK SYSTEM

Filed Nov. 14, 1961 3 Sheets-Sheet 2

United States Patent Office 3,219,982

Patented Nov. 23, 1965

3,219,982

HIGH ORDER MARK SYSTEM

Stuart G. Tucker, Poughkeepsie, N.Y., assignor to International Business Machines Corporation, New York, N.Y., a corporation of New York Filed Nov. 14, 1961, Ser. No. 152,320
4 Claims. (Cl. 340—172.5)

This invention relates to electronic computers which perform logical operations serially on data stored therein and more particularly to a serial data processing apparatus having provisions to determine when all significant parts of a word of data have been processed.

Computation time can be saved in serial mode computers if it can be determined at some point in the operation that one or both of the words being processed have no further significant digits remaining to be processed and hence that the operation may be terminated before its normal ending. One partial solution to this problem is to use a word mark which is placed above the highest digits of each word and is used to limit the serial operations to the actual length of a word. This is satisfactory so long as each word can be examined after each operation to have its word mark repositioned. In recent large computers, however, data transfers are made in parallel and the programmer has an option to logically process words either in parallel for those with a fixed format or serially for those with a variable format. Use of word marks of the type described above would require a disproportionate amount of equipment to maintain the word mark current through all possible operations. The extra equipment would contain many logical levels and would be unacceptably slow, complicated, and expensive.

It is then an object of this invention to provide apparatus to determine at all times the location of the most significant binary bit in a register.

It is also an object of this invention to provide a high order bit detector which is directly responsive to the stored bits of a data word and which provides a continuous indication of the location of the highest order bit in a register.

Still another object is the provision of a high order bit detector which operates asynchronously and hence does not require separate processing time.

A further object is the provision of a high order bit indication which may be directly compared with the location of the bits to be processed next to enable an early termination of processing.

A still further object is to disclose a high order bit detector which provides a continuous indication of the location of the highest order bit stored in a register in combination with a bit address generator giving the register location of the bits which may be processed in the next operation together with a comparator to compare the location addresses and to terminte processing when the second location is of a higher denominational order than the first.

Another object is the provision in a data processing machine in which data is processed serially by groups of one or more bits starting with the least significant bit, of a detecting device to indicate the denominational position of the most significant bit of a data word stored in a register, of a second address generator to produce an indication of the denominational position of the group of bits to be processed in the next succeeding cycle of operations and of a comparator to compare the two sets of position indications and to give an output signal during the cycle in which the most significant bit is being processed whereby the results of the processing operation may be made immediately available when complete and nonsignificant processing operations may be eliminated. A data processing machine including the subject of this invention requires no additional machine time to generate the high order mark indication and responds immediately whether the data word is entered in parallel or serially into the register as well as when the word in the register is changed as a result of processing.

The foregoing and other objects, features and advantages of the invention will be apparent from the following more particular description of the preferred embodiment of the invention, as illustrated in the accompanying drawings.

*General description*

Figure 1:
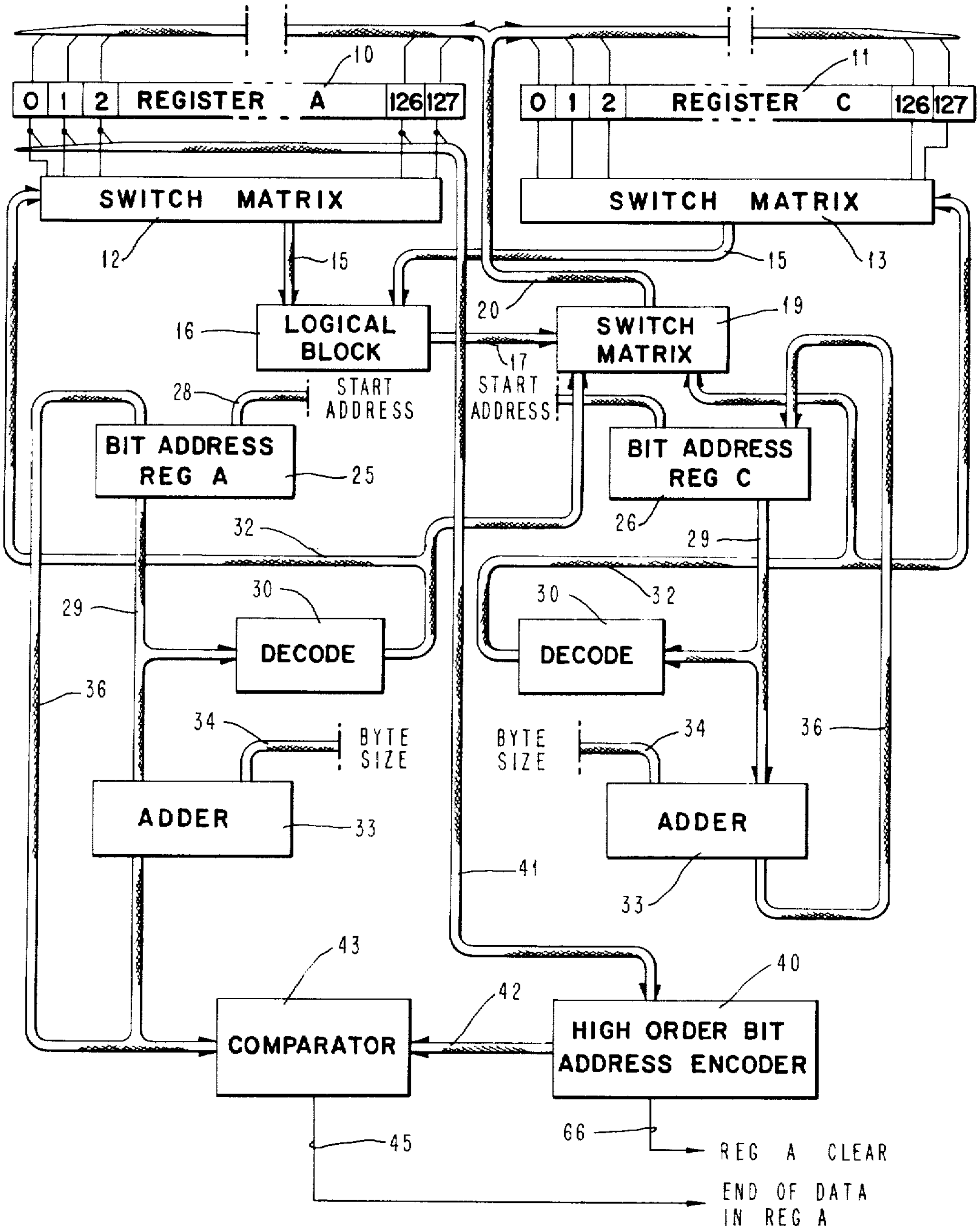
FIGURE 1 is a diagrammatic showing in block form of a portion of a data processor including the invention.

The block diagram of FIGURE 1 is a representation of a portion of the serially operating data processing mechanism of a large computer incorporated in the commercial IBM 7030 System and illustrates a sufficient portion of the computer to provide an understanding of the described embodiment of the invention. It is to be understood that the control circuits and data lines connecting the disclosed structure to other portions of the computer have been omitted from this drawing to simplify the showing but will obviously be present in a complete installation. As shown in FIGURE 1, the computer includes a storage register 10, designated Register A, and normally serving as an accumulator. A second similar storage register 11, designated Register C, receives operand factors from associated memory devices. Both Registers A and C are shown as capable of storing 128 binary bits in binary trigger circuits although data words are limited to 64 bits in length. Register A, however, may store the double precision mantissa of the multiplication of two 48 bit words and an exponent of two 64 bit words and Register C must be capable of retaining two 64 bit memory words since in the word format used, words are of variable length up to 64 bits and are not restricted by the word boundaries of the storage words. Thus, the word to be processed may occupy any section of the two storage words.

A switch matrix 12 is connected to each bit position of Register A and a second similar switch matrix 13 is connected to the orders of Register C. These switch matrices may be of the type shown in U.S. Patent application Serial No. 802,693, filed March 3, 1959, by J. C. Logue and assigned to the assignee of this application and function to supply data signals on from one to eight of the eight output lines 15 of each switch matrix, the data signals representing the data bits stored in the selected positions of registers 10 and 11. Both sets of lines 15 serve to supply input signals to logical block 16 which performs the programmed operation on the two sets of signals. This logical block 16 is diagrammatically shown as its details are not a part of the present invention and its operations may include arithmetic, logical connectives, conversion or any similar function within the designed capabilities of the block 16. The output signals of block 16 pass by a cable 17 to a third switch matrix 19 which is controllable to return the output signals of cable 17 over a cable 20 to the same selected bit positions in either register 10 or register 11 from which the matrices 12 and 13 selected signals.

The selection of the bit positions in registers 10 and 11 from which the switch matrices 12, 13 and 19 select bits and to which signals are returned is controlled for Register A by a Bit Address Register 25 and for Register C by a similar Bit Address Register 26. Each register 25 and 26 is large enough to contain the address of any bit in its associated register, i.e., seven bits capacity, and will be initially loaded via its start address lines 28 with the address of the bit position which is the lowest denominational order of the word to be processed. For Register A, this initial address will normally be loaded into Register 25 as either 63 or 111 since this Register A receives either single or double precision results of previous processings, but any other address may be specified in an instruction and loaded into Bit Address Register A. In Register C, however, the word to be processed may have its rightmost denomination at any register bit position and the address of this position will be loaded into Bit Address Register C. The stored address of each address register 25 and 26 is applied via its output cable 29 to a decode unit 30, each of which decodes the bit address signal to energize the lines of its output cable 32 to activate the proper switches in the associated switch matrix 12 or 13. Both output cables 32 run to switch matrix 19 where the signals of one are selected in accordance with which register 10 or 11 is to receive the output of logical block 16.

The bit address registers 25 and 26 are altered each machine cycle to provide the new bit addresses for the next cycle. As shown, the output cable 29 of a bit address register also goes as an input to an adder 33 having, for this size register 10 or 11, a seven bit capacity. A second input to adder 33 over cable 34 is a group of signals representing the complement of the size of the byte, eight or less bits, being processed. The complement of the byte size is used since in the embodiment shown the orders in the registers 10 and 11 are numbered upwardly from the left to the right in the register. The output of adder 33 represents the address of the lowest order bit of the byte to be processed in the next cycle and is transmitted over a cable 36 back to the input of its address register 25 or 26. The new addresses will be gated into registers 25 and 26 prior to the start of the next machine cycle. The byte size inputs for the adders 33 will normally be the same for arithmetic operations but may be of different values for other operations, e.g., in code conversion operations where the characters of a word in register 10 or 11 in one codal representation are to be converted into a different code having more or less bits per character and the results are to be stored in the other register.

*High order mark*

The preferred embodiment of the invention is applied to the data processor broadly described above and as shown in FIGURE 1, comprises an encoder 40 receiving, by a cable 41, the signals representing the data bits stored in Register A. These signals are encoded to form on output lines 42 an address signal representing the number of the byte of eight consecutive bits which contains the bit of highest denominational order in the register 10. This address is continuously compared in a comparator 43 with a portion of the changing address from adder 33 for Register A. Since the address on cable 36 is the bit address of the lowest denominational order of the byte which will be processed in the next machine cycle, as soon as the byte designating portion of this address is less than the byte address on lines 42, a signal will be given on comparator output line 45 to indicate that the last data in Register A is being processed in the present machine cycle. Certain processing operations may be terminated at this point without the need for processing the remaining bit positions which are known to contain no significant data.

Figure 2:
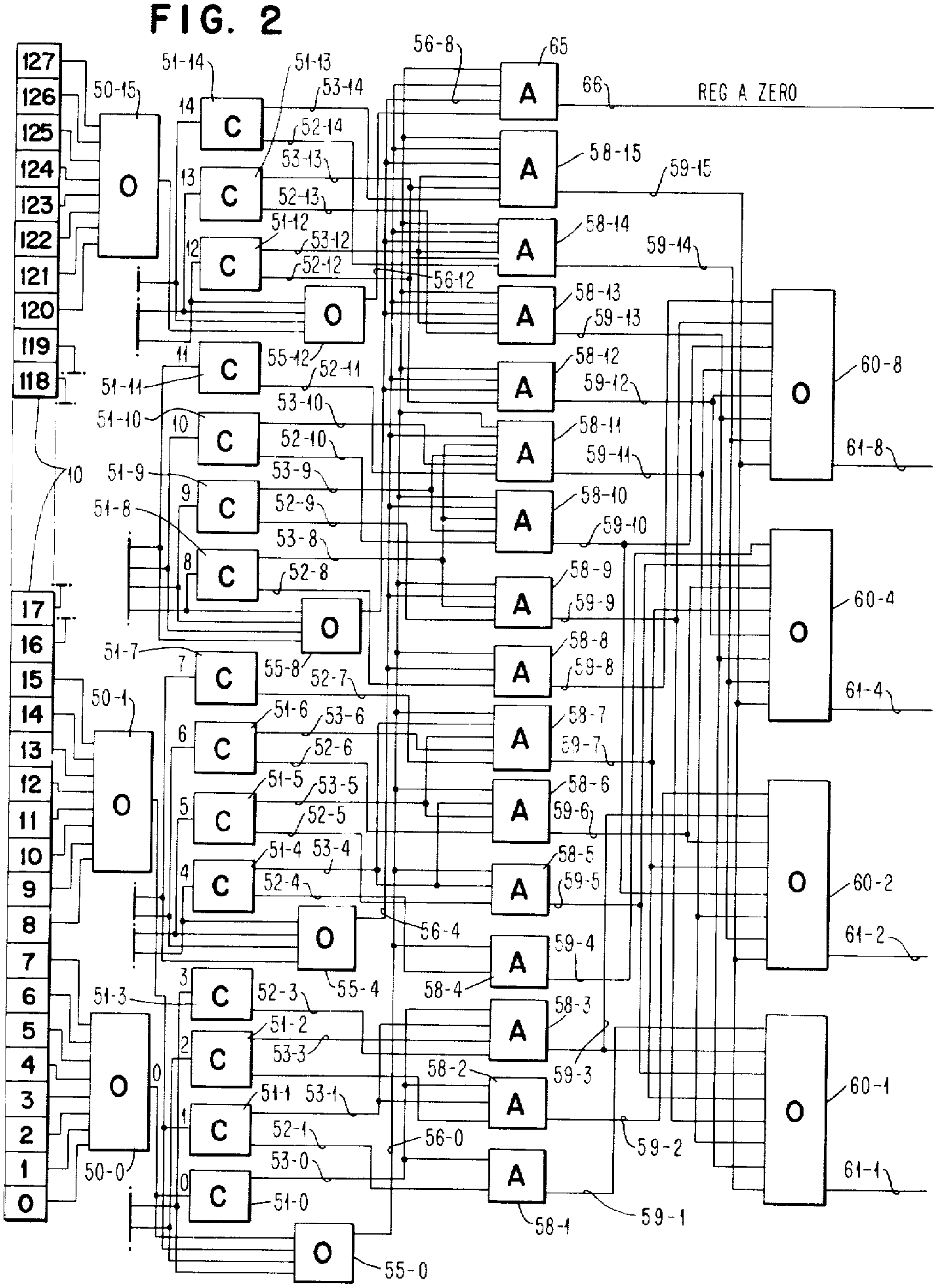
FIGURE 2 is a schematic diagram of one of the registers and the address encoder connected therto.

The highest order bit address encoder 40 is shown in more detail in FIGURE 2. In this figure, the reference numeral for each component specific to a byte of eight consecutive bits in Register A has appended the number of its byte to facilitate reference to a particular part. A numeral without an appended byte number refers generally to all similar units. In FIGURE 2, the 128 storage positions of Register A are indicated along the left side. These bit positions are grouped into 16 bytes of eight bit positions each with the "0" byte including bit positions 0 to 7, the "1" byte positions 8 to 15, etc. The output signals from the eight bit positions of a byte are connected as inputs to an OR circuit 50 which will supply an output signal when any bit position connected thereto contains a significant bit. Each OR 50 except OR 50–15 has its output connected to the input of a converter 51 (0–14) which powers two output lines 52 and 53, the lower line 52 corresponding to the input signal while the upper line 53 corresponds to the complement of the input signal. Additionally, the output signals of OR's 50–0 to 50–3 are inputs of a complementing OR circuit 55–0 which will have a significant voltage on its output line 56–0 when none of the OR's 50–0 to 50–3 has its output at a significant level. Similarly, OR's 50–4 to 50–7 connect to a complementing OR 55–4, OR's 50–8 to 50–11 connect to OR 55–8 and OR's 50–12 to 50–15 are connected to OR 55–12.

A group of AND circuits 58–1 to 58–15, each of which will supply an output signal only when all of its inputs are at a significant level, are connected to combinations of the output lines 52, 53 and 56 and serve to give an output signal on one and only one of the output lines 59 of the AND's 58 if the "0" byte does not contain a significant bit. Referring to the figure, it will be seen that for each group of four converters 51, each AND 58 receives an input from line 52 of the corresponding converter and from line 53 of each converter 51 of a higher denominational order (lower numbered) byte. Also, each AND 58–4 to 58–15 is connected to line 56 of the OR's 55 of each lower numbered group of four OR's 50, i.e., AND's 58–4 to 58–15 connect to 56–0, AND's 58–8 to 58–15 also connect to 56–4, and AND's 58–12 to 58–15 are also connected to 56–8. With this combination of inputs, each AND will be inhibited when any of the four OR's 50 of a hihger denominational quarter of the Register A receives a significant bit signal and will also be inhibited if any OR 50 having a lower number in its group of four receives a bit signal.

The output lines 59–1 to 59–15 of AND's 58 are connected as inputs to four OR circuits 60–1, 60–2, 60–4 and 60–8 having output lines 61–1, 61–2, 61–4 and 61–8. It will be noted that each output line 59 is an input to the OR's 60 whose appended numbers are required in forming the binary sum equal to the appended number of the active line 59 so that the combination of the active lines 61 is the binary address of the byte having the highest denominational stored bit in register 10.

In any automatically operating computer, it is necessary to have an indication that the register contains no information to prevent such unterminable operations as division with a zero divisor or useless operations as addition of zero to another factor. The present structure provides such an indication at slight expense. An AND circuit 65, FIGURE 2, has each of the lines 56–0, 56–4, 56–8, and 56–12 as an input. Since each line 56 is at a significant level when there is no bit stored in the 32 associated denominational orders of register 10, when all four 58 lines are at that level, there is no bit stored in the register and the output line 66 of AND 65 goes to the significant level to provide an indication of this clear register.

*Comparator*

Figure 3:
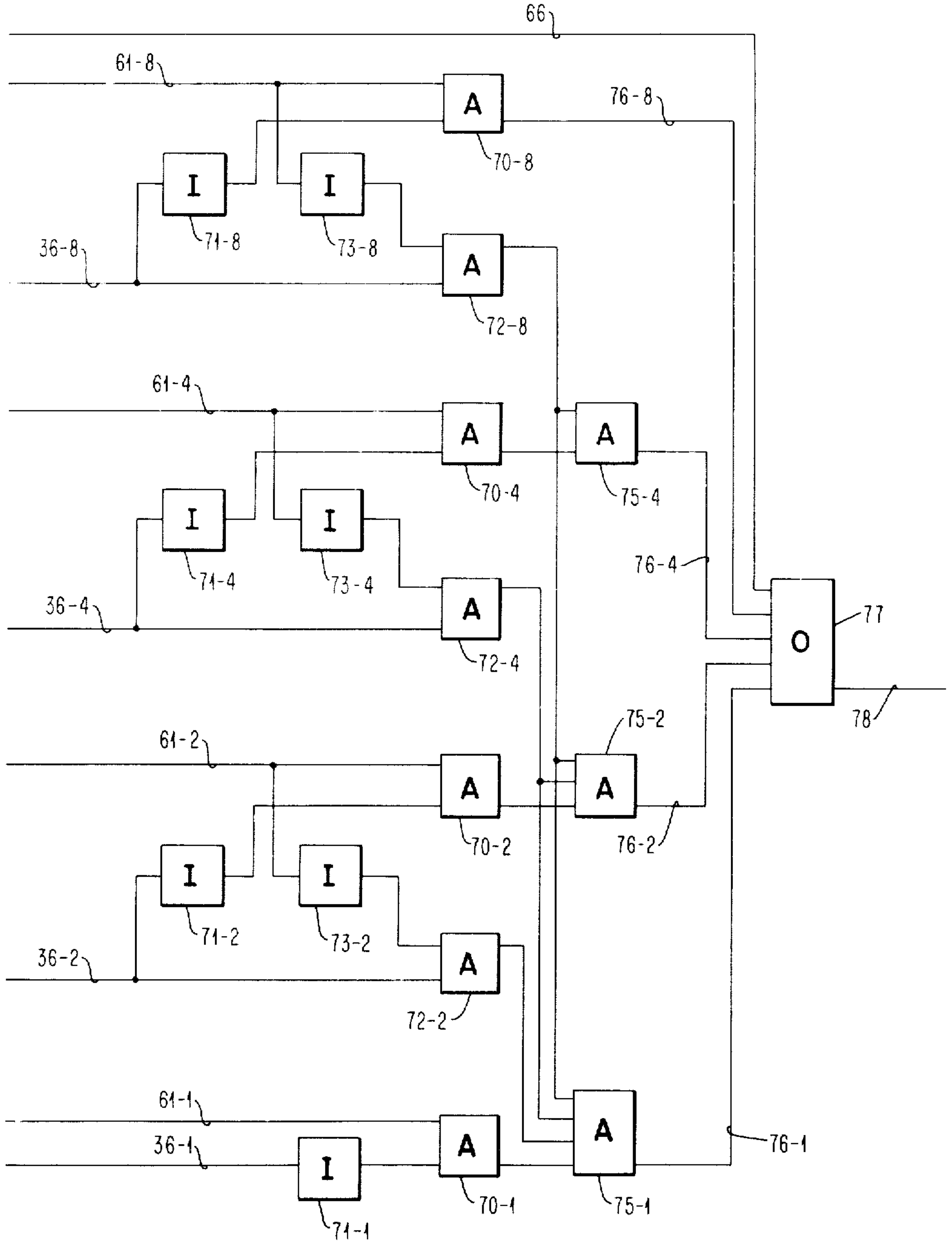
FIGURE 3 is a schematic diagram of the comparator of FIGURE 1.

The comparator 43, FIGURE 1, is shown in more detail in FIGURE 3 and operates to generate a signal when the byte designating portion of the bit address from adder 33, FIGURE 1, for Register A is less in value than the address of the byte having the most significant bit of Register A. In FIGURE 3, the four lines 61–8, 61–4, 61–2 and 61–1 from the encoder of FIGURE 2 and having the byte address of the highest significant bit, enter on the left side together with the corresponding lines 36–8, 36–4, 36–2 and 36–1 from the adder 33, FIGURE 1. Since the adder output is the address of any bit of Register A, cable 36 will also have three other lines 36 for selecting a specific one of the eight bits of a byte but these lines are not used in the comparator 43 and are not specifically numbered. For each pair of lines 61 and 36, an AND circuit 70 is connected to receive the signal on line 61 directly and to receive the signal on line 36 through a signal inverter 71. An output signal from AND 70 will therefore indicate that, for its pair of lines 61 and 36, the byte address 61 is higher in number value than the corresponding address on line 36. To indicate when the two signals on corresponding lines 61 and 36 are the same or that the signal on line 36 is not significant while that on line 61 is significant, a second AND circuit 72 with an inverted output (i.e., NAND circuit) receives the signal on line 36 directly and that of line 61 through an inverter 73. This part of the circuit has been omitted for lines 61–1 and 36–1 since, as will be seen later, it would be of use only to determine equality of the input addresses and such information is not needed in the present embodiment. The complemented output of each AND 72 will be at a significant level so long as the address signal on its line 36 is equal to or less than that on its line 61.

An AND circuit 75–4 has as inputs the output signals from AND 72–8 and from AND 70–4. The signal from AND 72–8 indicates that the byte address on line 61–8 is equal to or more than the adder 33 bit address on line 36–8, only the equal part being of interest here since if the byte address on 61–8 is greater than the bit address on lines 36–8, this is indicated by AND 70–8 and the signal from AND 70–4 indicates whether or not the byte address on line 61–4 is greater than the bit address on line 36–4. Two significant inputs to AND 75–4 activate its output line 76–4 to signal that for lines 61–8, 36–8, 61–4 and 36–4, the byte address is greater than the byte portion of the bit address. For lines 36–8 and 61–8, the output line 76–8 of AND 70–8 will be activated when the highest byte address on line 61–8 is greater than bit address on line 36–8. A second AND circuit 75–2 receives the outputs of AND 72–8, AND 72–4 and AND 70–2 and activates an output line 76–2 when the signals on the pairs of lines 36–8, 61–8 and 36–4, 61–4 are equal and that on line 61–2 is significant while that on line 36–2 is not. A third AND 75–1 receives the outputs of AND 72–8, AND 72–4, AND 72–2 and AND 70–1 and similarly activates its output line 76–1 when the signals on the pairs of wires 61–8 and 36–8, 61–4 and 36–4, and 61–2 and 36–2 are equal and the signal on line 61–1 is significant while that on line 36–1 is not. The four signals on lines 76 and that on line 66, FIGURE 2, are applied as inputs to an OR circuit 77 having an output line 78 which will be activated whenever the byte address on lines 61 is greater than the byte portion of the bit address on lines 36.

Thus the above structure serves to generate the address of the eight bit byte of the Register A containing the most significant bit and compares this address with the byte portion of the address of the lowest denominational bit of the byte to be processed in the next machine cycle to thereby signal when the last significant bit stored in the register 10 is being processed. This signal may be used as desired to cause a program skip to a succeeding step and thus avoid non-useful cycles.

It is to be realized that in the above-described embodiment, an occasional combination of high order zeros in a register byte and a short processing byte size may permit one or several non-useful machine cycles before a signal is given on line 78, FIGURE 3. This is due to the generation of the address of an eight bit byte on lines 61 and the non-use of the three lines 36 designating the bit address within the byte to be processed, the remaining four lines being in effect the address of the eight bit byte from which the lowest denominational bit will be extracted by shift matrix 12. If economically feasible, a simple enlargement of the above structure will enable elimination of these occasional useless cycles by generating and comparing the addresses of smaller byte units even down to individual bits.

While the invention has been particularly shown and described with reference to a particular embodiment thereof, it will be understood by those skilled in the art that various changes in form and details may be made therein without departing from the spirit and scope of the invention.

What is claimed is:

1. In a data processing machine of the class described having a factor storage register and selectively operable switch means to serially extract data therefrom in bytes, an address register including an incrementing device to control said data extracting means and to generate signals representing the next address which will be used to control of said data extracting switch means, an address encoder connected to said factor storage register to produce a group of signals representing in combination, the denominational order of the most significant bit of data in said storage register and a comparator receiving said group of signals and said address representing signals and acting to produce an operation modifying signal when said address representing signals indicate a higher denominational order than is indicated by said group of signals.

2. In a data processing machine of the class described having a factor storage register comprising a plurality of denominational orders, each capable of retaining a bit of said factor, selectively operable switch means to extract data from said register in successive bytes of a selected number of bits serially from lower to higher denominational orders, a denominational order address generator including an incrementing means to control said data extracting means and to generate a combination of signals representing the denominational order of the least significant bit in the next byte to be extracted, an address encoder connected to the denominational orders of said register to produce a combination of signals representing the register portion in which is stored the most significant bit of data of said factor and a comparison unit to compare said two combinations of signals and to generate an output signal when the address of the least significant bit of the next byte to be extracted is in higher denominational orders than the register portion having the most significant bit of data.

3. In a data processing machine of the class described having a factor storage register comprised of a plurality of denominational orders, a switch matrix to extract data from said register in bytes of a selected number of consecutive denominational orders, an address storage register to retain the address of the lowest denominational order of the extracted byte, an adder circuit connected to said address storage register to generate a plurality of signals representing the corresponding address of the next byte to be extracted, a high order bit address encoder connected to said factor storage register to generate a plurality of signals representing the location of the most significant bit of data in a stored factor, and an address comparator receiving both said pluralities of signals and generating an output signal when said corresponding address is at a higher denominational position of said factor register than the address of the most significant bit of data therein.

4. A data processing machine having a data storage register to form a static representation of the bits of a data word, a plurality of means, each means to detect the presence of a stored bit in any order of an associated group of consecutive denominational orders of said register, an address generating means responsive to said plurality of means to produce a combination of signals indicative of the highest denominational order group of said register in which a significant bit is stored, a data converting unit, switch means to transfer signals representing the data stored in a register group to said converting unit, a switch controller to produce a combination of signals indicative of the next register group to be transferred through said switch means, and a comparator responsive to both combinations of signals to indicate that the group having the highest order significant bit is being transferred to said converting unit.

References Cited by the Examiner

UNITED STATES PATENTS 2,989,731 6/1961 Albanes ----------- 340—172.5

ROBERT C. BAILEY, *Primary Examiner.*